(12) United States Patent
Okajima et al.

(10) Patent No.: US 6,229,528 B1
(45) Date of Patent: May 8, 2001

(54) TABLET STACKED ON LCD READ AFTER DISPLAY LINE PULSE SIGNAL IN ORDER TO AVOID IMPULSE NOISE SUPERPOSED ON THE TABLET COORDINATE SIGNAL TO IMPROVE MEASURING ACCURACY

(75) Inventors: Yoshio Okajima; Akihiro Masuda, both of Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/188,385

(22) Filed: Nov. 10, 1998

(30) Foreign Application Priority Data

Nov. 14, 1997 (JP) ...................................................... 9-313193

(51) Int. Cl.<sup>7</sup> .............................. G09G 5/00; G06K 11/06
(52) U.S. Cl. ........................................ 345/173; 178/18.01
(58) Field of Search .................................... 345/173, 174, 345/179; 178/18.01, 18.03, 18.05, 18.06, 18.07, 18.08, 19.01, 19.03, 20.01, 20.02, 20.03, 20.04

(56) References Cited

U.S. PATENT DOCUMENTS

| 5,113,042 | * | 5/1992 | Mletzko | 178/18.02 |
|---|---|---|---|---|
| 5,327,163 | * | 7/1994 | Hashimoto et al. | 345/173 |
| 5,642,134 | * | 6/1997 | Ikeda | 345/174 |
| 5,777,604 | * | 7/1998 | Okajima et al. | 345/173 |
| 5,859,392 | * | 1/1999 | Petty | 178/18.01 |
| 5,889,511 | * | 3/1999 | Ong et al. | 345/173 |
| 5,923,320 | * | 7/1999 | Murakami et al. | 345/173 |
| 5,940,064 | * | 8/1999 | Kai et al. | 345/173 |
| 5,945,973 | * | 8/1999 | Sakai et al. | 345/173 |
| 6,005,200 | * | 12/1999 | Stanchak et al. | 178/19.01 |

FOREIGN PATENT DOCUMENTS

| 0 383 304 | 8/1990 | (EP) . |
|---|---|---|
| 0 541 102 | 5/1993 | (EP) . |
| 0 544 300 | 6/1993 | (EP) . |
| 0 589 498 | 3/1994 | (EP) . |
| 6-161658 | 6/1994 | (JP) . |

\* cited by examiner

*Primary Examiner*—Steven Saras
*Assistant Examiner*—Paul A. Bell
(74) *Attorney, Agent, or Firm*—Nixon & Vanderhye P.C.

(57) ABSTRACT

A liquid crystal tablet equipment which allows improvement in accuracy of coordinate measurements by removing undesirable influence of noise caused by line pulse signals applied to a liquid crystal display and allows coordinate measurement in shorter time period includes a liquid crystal display, a liquid crystal display control circuit for applying the line pulse signals at a prescribed interval to each of an array of pixels constituting the liquid crystal display, a tablet stacked on the liquid crystal display, an A/D converter receiving a coordinate signal output from the tablet, a tablet control circuit for calculating coordinate data from a digital signal output from the A/D converter, and a CPU for letting A/D converter output the digital signal after a prescribed time period from a timing of activation of the line pulse signal.

18 Claims, 10 Drawing Sheets

TABLET STACKED ON LCD READ AFTER DISPLAY LINE PULSE SIGNAL IN ORDER TO AVOID IMPULSE NOISE SUPERPOSED ON THE TABLET COORDINATE SIGNAL TO IMPROVE MEASURING ACCURACY

BACKGROUND OF THE INVENTION

1. Field of the Invention

The present invention relates to a coordinate data output equipment and a liquid crystal tablet equipment mounted on an electronic organizer, a personal digital assistant (PDA) or the like, for allowing input operation by a pen touch or finger touch, for example. More specifically, the present invention relates to a coordinate data output equipment and a liquid crystal tablet equipment having high coordinate measuring accuracy.

2. Description of the Background Art

A liquid crystal tablet equipment (coordinate data output equipment) includes a liquid crystal display and a tablet as a coordinate reading equipment stacked on the liquid crystal display, so as to attain matching between an input through the tablet and a display output on the liquid crystal display.

When a display signal is to be applied to a liquid crystal dot, a DC component is applied to the liquid crystal dot, which shortens service life of liquid crystal. Therefore, generally, polarity of a voltage applied to the liquid crystal dot is inverted at every prescribed time period to obtain an ac signal. More specifically, a liquid crystal driver generates an ac converting signal (polarity inverting signal) which is a square wave repeatedly rises and falls at every prescribed time period. The liquid crystal driver inverts the display signal at a timing of an edge of the AC converting signal, and the display signal is applied to the liquid crystal display device.

The tablet includes two transparent conductive films having uniform resistance distribution, opposed to each other with a small distance therebetween. One conductive film includes electrodes on upper and lower sides. The other conductive film includes electrodes on left and right sides. By applying voltage to the electrodes at different timings, a prescribed current is caused to flow through respective conductive films, whereby voltage gradients are generated in X and Y directions. When the tablet is pressed by a pen, for example, two conductive films are brought into contact at the pressed designated point. First, a voltage gradient is generated in the X direction and the voltage value at the contact point is read, which value provides a signal on the X coordinate. Thereafter, a voltage gradient is generated in the Y direction and voltage value at the contact point is read, which provides a signal on the Y coordinate. These X and Y coordinate signals, which are analog signals, are converted to digital signals by A/D conversion, and input to a CPU.

When the display signal to be applied to the liquid crystal dot has its polarity inverted in accordance with the ac inverting signal in the liquid crystal display, an electromagnetic wave in the form of a strong impulse is generated, which electromagnetic wave is superposed as a noise on the coordinate signals of the tablet stacked on the liquid crystal display, possibly degrading accuracy in coordinate measurement. More specifically, the timing of polarity inversion of the display signals in accordance with the ac converting signal is not synchronized with the timing of tablet detection, and therefore it may be possible that these timings happen to match each other. In that case, noise is superposed on the coordinate signals.

Japanese Patent Laying-Open No. 6-161658 discloses a liquid crystal tablet equipment which is proposed as a solution of the above described problem. In the equipment, a delay circuit for delaying, by a prescribed time period, the ac signal is provided, the delayed signal is passed to a tablet driving circuit as a tablet detection timing signal, and A/D converting operation of an A/D converter in a tablet driving circuit is started at an edge of the tablet detection timing signal. In this manner, it is possible to offset the timing of A/D conversion of the coordinate signals from the edge of the ac converting signal, that is, from the timing of polarity inversion of the display signals. Accordingly, the coordinate signals can be subjected to A/D conversion at a timing not causing any superposition of noise.

However, the ac converting signal has small frequency and long period. Therefore, the tablet detection timing signal obtained by delaying this signal also has long period, wait time until the start of A/D conversion of the coordinate signal becomes considerably long, and therefore it takes much time to measure the input coordinate point on the tablet.

Further, there is another more fundamental problem. The noise caused by the electromagnetic wave from the liquid crystal display to the tablet is generated not only at the timing of the edge of the ac converting signal. It is possible that an electromagnetic wave in the form of a strong impulse is generated when a line pulse (gate pulse signal) applied to liquid crystal dot array of the liquid crystal display attains active, which electromagnetic wave may possibly be superposed as noise on the coordinate signal of the tablet. The prior art described in the aforementioned laid-open application cannot remove the influence of the noise caused by the line pulse.

Further, when the timing of the edge of the ac converting signal and the timing of activation of the line pulse coincide in time, the noise superposed on the coordinate signal would be far greater. In that case, if the tablet detection timing signal is output after a delay of a prescribed time period provided by the delay circuit, A/D converting operation of the coordinate signal starts before sufficient attenuation of the noise, degrading accuracy in coordinate measurement.

SUMMARY OF THE INVENTION

The present invention was made to solve the above described problems and its object is to provide a coordinate data output equipment and a liquid crystal tablet equipment which allows improvement in coordinate measurement accuracy by removing undesirable influence of noise caused by a line pulse signal applied to the liquid crystal display and allowing coordinate measurement in short period of time.

Another object of the present invention is to provide a coordinate data output equipment and a liquid crystal tablet equipment which allows improvement in coordinate measurement accuracy by removing undesirable influence of noise caused by a line pulse signal applied to the liquid crystal display, allows coordinate measurement in short time period and consumes less power.

A still further object of the present invention is to provide a coordinate data output equipment and a liquid crystal tablet equipment which allows improvement in coordinate measurement accuracy by removing undesirable influence of noise caused by a line pulse signal and an ac converting signal applied to the liquid crystal display, and allows coordinate measurement in a short period of time.

A still further object of the present invention is to provide a general purpose coordinate data output equipment and a liquid crystal tablet equipment which allows improvement in coordinate measurement accuracy by removing undesirable influence of noise caused by a line pulse signal applied to the liquid crystal display, allows coordinate measurement in short period of time and consumes less power.

The liquid crystal tablet equipment in accordance with an aspect of the present invention includes: a liquid crystal display 15; a liquid crystal display control circuit 14 for applying line pulse signals at a prescribed interval to an array of pixels constituting the liquid crystal display 15; a tablet 17 stacked on the liquid crystal display 15; an A/D converter 18 receiving a coordinate signal output from the tablet 17; a tablet control circuit 16 for calculating coordinate data from a digital signal output from the A/D converter; and a CPU 11 for letting A/D converter 18 to output the digital signal after the lapse of a prescribed time period from the timing at which the line pulse signal is rendered active.

After the lapse of a prescribed time period from the timing of activation of the line pulse signal generated by the liquid crystal display control circuit 14, the A/D converter 18 converts the coordinate signal output from the tablet 17 to a digital signal. Thereafter, tablet control circuit 16 calculates the coordinate data from the digital signal. Noise is attenuated during the lapse of the prescribed time period and, after that time period, the noise is substantially 0. Therefore, the coordinate signal does not include any noise component, ensuring high accuracy in coordinate measurement. Further, not the timing of an edge of the ac converting signal having long period, but the timing at which the line pulse signal having short period is activated is used as starting point of the prescribed time period. Therefore, regardless of what timing the tablet is touch-designated, the wait time until conversion of the coordinate signal to the coordinate data is made shorter, and therefore the time necessary for measuring the input coordinate data to the tablet can be made shorter. Further, as more fundamental function, not only the undesirable influence of noise caused by the edge of the ac converting signal but also the undesirable influence of noise caused by activation of the line pulse signal can be avoided. Further, even if the timing of an edge of the ac converting signal and the timing of activation of the line pulse signal coincide in time, undesirable influence of noise can be avoided.

Preferably, CPU 11 counts the number of line pulse signals from the timing of activation of the line pulse signal, and after a prescribed time period from the time point when the count value of the line pulse signal attains a prescribed value, the CPU 11 has the A/D converter 18 output digital signal. Further, the prescribed value is determined dependent on the relation with the time necessary for a switching element constituting the tablet control circuit 16 to be electrically stable.

The coordinate data is measured after the switching element constituting the tablet control circuit 16 is made electrically stable. Therefore, power consumption of the tablet control circuit 16 can be suppressed.

Further, the liquid crystal display control circuit 14 further applies an ac converting signal of which polarity is inverted at a prescribed interval, to the liquid crystal display 15. The liquid crystal tablet equipment further includes an ac converting signal inversion detecting circuit 27 for detecting inversion of polarity of the ac converting signal. CPU 11 has A/D converter 18 output the digital signal after a prescribed time period from the timing of activation of the line pulse signal with the polarity of the ac converting signal not inverted.

When the ac converting signal is inverted, the coordinate signal is not converted to the coordinate data. Therefore, coordinate data with high measurement accuracy is obtained without the influence of considerable noise generated at the timing of inversion of the ac converting signal.

More preferably, CPU 11 measures, after a prescribed time period from the timing of activation of the line pulse signal, pushing pressure of one of X and Y directions of the tablet 17. When the pushing pressure in one direction is a first pressure or more, the CPU 11 has A/D converter 18 convert the coordinate signals in X and Y directions output from the tablet 17 to digital signals, has the tablet control circuit 16 convert the digital signals to coordinate data, and after conversion to the coordinate data, measures pushing pressure of the other one of the X and Y directions of the tablet 17. If the pushing pressure of this direction is a second pressure or more, it is determined that the coordinate data is accurate.

Before and after conversion of coordinate signals in X and Y directions to the coordinate data, pushing pressure is measured. Therefore, the tablet control circuit 16 can obtain coordinate signals with high pushing pressure, and hence highly accurate coordinate data can be obtained.

According to another aspect, the liquid crystal tablet equipment includes: a liquid crystal display 15; a liquid crystal display control circuit 14 for outputting line pulse signals at a prescribed interval to an array of pixels constituting the liquid crystal display 15; a tablet 17 stacked on the liquid crystal display 15; an A/D converter 18 receiving coordinate signals output from the tablet 17; a tablet control circuit 16 for calculating coordinate data from the digital signals output from A/D converter 18; a first counter 25 for counting the number of system clocks from the timing of activation of the line pulse signals until a number reaches a first count number; and a CPU 11 for having A/D converter 18 output a digital signal after counting by the first counter 25 is up. The first count number is determined dependent on the time for the noise of the coordinate signal generated by activation of the line pulse signal to attenuate.

After the count up of the first counter, the A/D converter 18 converts the coordinate signal output from the tablet 17 to a digital signal, and the tablet control circuit 16 calculates the coordinate data from the digital signal. Until counting up of the first counter, the noise is attenuated and immediately after the lapse of the time period, the noise is substantially 0. Therefore, the coordinate signal does not include any noise component, and coordinate measurement accuracy is high. Further, not the timing of an edge of the ac converting signal having long period but a timing of activation of the line pulse signal, having a short period, is used as a start point of the prescribed time period. Therefore, regardless of the timing of touch-designation of the tablet, the wait time until the coordinate signal is converted to the coordinate data is made shorter, and hence the time necessary for measuring the input coordinate data to the tablet can be made shorter. Further, as more fundamental function, not only the undesirable influence of noise caused by the edge of the ac converting signal but also the undesirable influence of noise caused by activation of the line pulse signal can be avoided. Further, even if the timing of an edge of the ac converting signal and the timing of activation of the line pulse signal coincide in time, undesirable influence of noise can be avoided.

Preferably, the liquid crystal tablet equipment includes a second counter 21 for counting the number of system clocks up to a second count number, and a third counter 23 for counting, from the time point of counting up of the second counter 21, the number of line pulse signals until a third count number. The second count number is determined dependent on the relation of time for the switching element constituting the tablet control circuit 16 to be electrically stable. The first counter 25 starts counting from the time point of counting up of the third counter 23.

The coordinate data is measured after the switching element constituting the tablet control circuit 16 attains electrically stable. Therefore, power consumption of the coordinate data converting unit can be suppressed.

More preferably, the liquid crystal tablet equipment includes a first register 26 for setting the first count number in the first counter 25.

Even when the type or specification of the liquid crystal tablet equipment is changed and the duration of noise varies, it is possible to calculate and change the first count number in accordance with the type or specification of the equipment. Therefore, a general purpose coordinate data output equipment can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
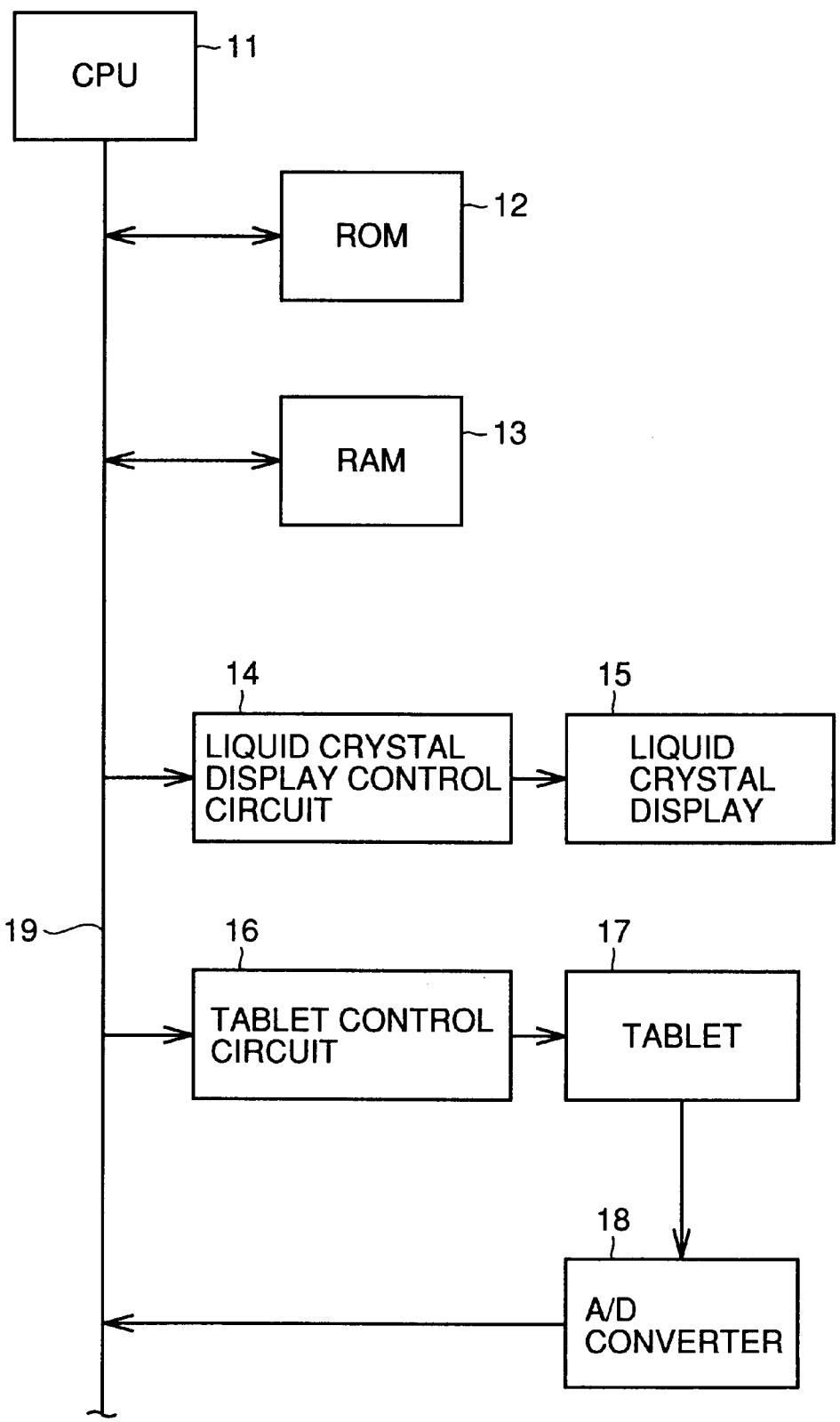
FIG. 1 is a block diagram showing electrical configuration of the liquid crystal tablet equipment in accordance with a first embodiment of the present invention.

The liquid crystal tablet equipment in accordance with the first embodiment of the present invention will be described with reference to the figures. In the following description, same components are denoted by the same reference characters. These components have the same names and functions, and therefore description is not repeated.

Referring to FIG. 1, a liquid crystal tablet equipments includes a CPU (Central Processing Unit) 11 for performing arithmetic operation, an ROM (Read Only Memory) 12 for storing a program, an RAM (Random Access Memory) 13 for temporarily storing various data, a liquid crystal display control circuit 14, a liquid crystal display 15, a tablet control circuit 16, a resistive film type and pressure sensitive type transparent tablet 17, and an A/D converter 18 for converting analog X and Y coordinate signals detected by tablet 17 to digital data. Tablet 17 is stacked on a surface of liquid crystal display 15. Liquid crystal display control circuit 14 and tablet control circuit 16 are connected to a bus line 19 extending from CPU 11 through prescribed interfaces (not shown).

Figure 2:
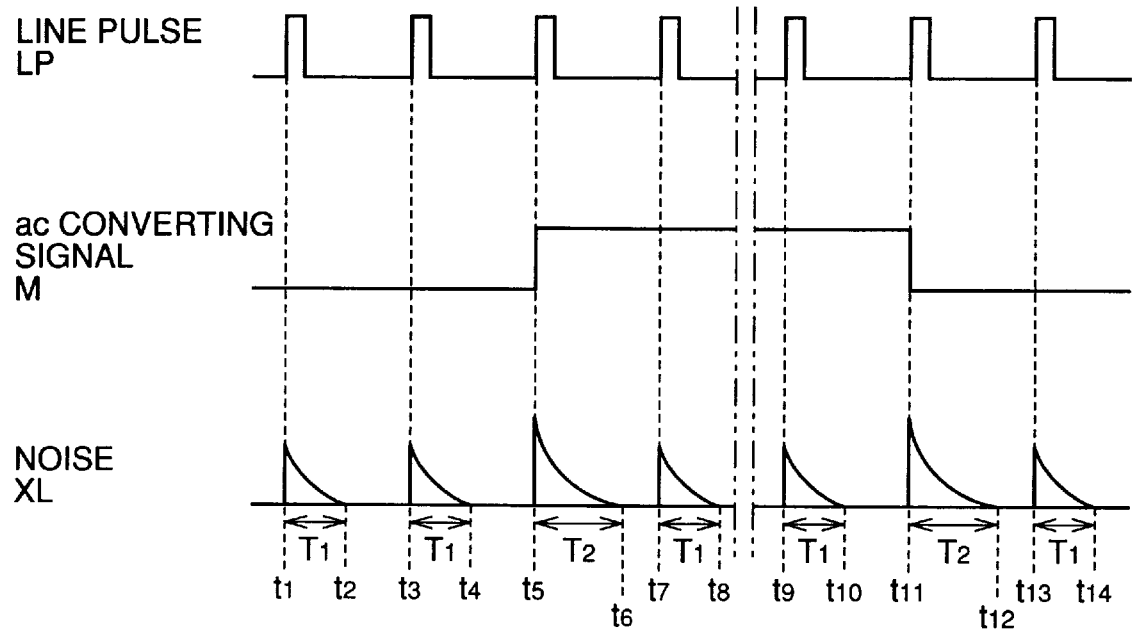
FIG. 2 is a diagram of waveforms representing relation of a line pulse, an ac converting signal and noise induced on the tablet of the liquid crystal display control circuit.

Referring to FIG. 2, relation between each of a line pulse LP, an ac converting signal M generated in liquid crystal display control circuit 14 and noise XL induced on tablet 17 will be described. At timings $t_1$, $t_3$, $t_5$ and $t_7$ at which line pulse LP is activated to "H" (high) level and at timings $t_5$ and $t_{11}$ at which polarity of the display signal is inverted at rising and falling edges of the ac converting signal M, an electromagnetic wave in the form of a strong impulse is generated. The electromagnetic wave induces noise XL in tablet 17. Especially at the timings $t_5$ and $t_{11}$ at the edges of the ac converting signal M, the noise XL has high level. The noise generated only by the line pulse LP attains to the 0 level after the lapse of a time period $T_1(=t_2-t_1)$ from its generation. The time $T_2(=t_6-t_5)$ for the noise generated by the ac converting signal M from generation to 0 level is longer than the time period $T_1$.

When tablet 17 is pressed by a pen or the like, and X and Y coordinate signals of the pressed designated point are output as analog signals. The analog signals are converted to digital data in A/D converter 18 and taken in CPU 11.

When the detected coordinate signals of tablet 17 are subjected to A/D conversion by A/D converter 18 at random timings, CPU 11 may possibly take erroneous data containing noise component. Therefore, the detected coordinate signal is subjected to A/D conversion after the prescribed time period $T_2$ (the time necessary for the noise of higher level to attain the zero level) from the timing of activation of line pulse LP. In this manner, undesirable influence of noise can be avoided and accuracy in coordinate measurement is improved. It should be noted in comparison with the prior art that the starting point for the prescribed waiting time is not that timing of an edge of the ac converting signal M but the timing of activation of the line pulse LP.

Figure 3:
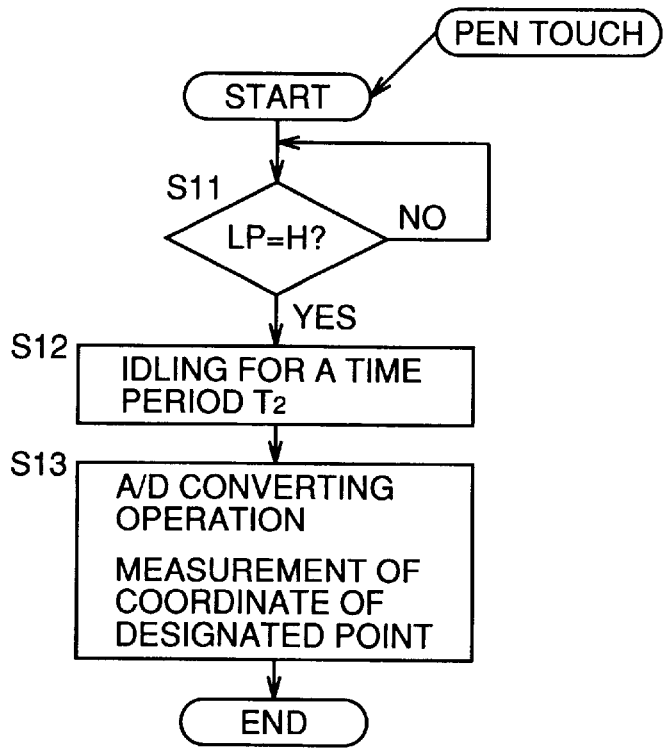
FIG. 3 is a flow chart related to the operation of the liquid crystal tablet equipment in accordance with the first embodiment.

The control operation will be described with reference to FIG. 3. In the flow chart of FIG. 3, it is assumed that pressing of a certain point of tablet 17 by a pen or the like has already been detected (pen touch). Control operation is temporarily stopped (S11), waiting for the rise of the line pulse LP to the active ("H") level. Idling for a prescribed time period $T_2$ is performed (S12). A/D converter 18 starts A/D converting operation. More specifically, A/D converter 18 converts analog X and Y coordinate signals output from tablet 17 to digital data. CPU 11 receives the converted X and Y coordinate data, and performs coordinate measurement of the designated point pressed by the pen or the like (S 13).

The necessary wait time $T_2$ varies dependent on the space between the liquid crystal display 15 and tablet 17 stacked thereon. Assuming that the period of line pulse LP is 60

μsec, T2 may be set to 50 μsec. Here, T1 is about 30 μsec. In this case, A/D conversion may be completed within 10 μsec from time point t6 to t7. During the time T2, the noise is attenuated and immediately after the lapse of the time period, the noise is substantially 0. Therefore, the A/D converted X and Y coordinate data do not include any noise component, and hence coordinate measurement accuracy is high.

As a start point of the period T2, not the timing of an edge of the ac converting signal M having long period but the timing of activation of line pulse LP having short period is used. Therefore, no matter at what timing the tablet 17 is pressed by a pen or the like, the wait time until the start of A/D conversion of X and Y coordinate signals can be made shorter. Therefore, the actual time period necessary for measuring the input coordinate point on tablet 17 can be reduced.

Further, as more fundamental function, not only the undesirable influence of noise caused by the edge of the ac converting signal M but also the undesirable influence of noise caused by activation of line pulse LP can be avoided. Further, even if the timing of an edge of the ac converting signal M and the timing of activation of line pulse LP coincide in time, undesirable influence of the noise can be avoided.

Second Embodiment

In the liquid crystal tablet equipment in accordance with the second embodiment, after a tablet determining circuit provided in tablet control circuit 16 is activated and after a transistor in tablet control circuit 16 becomes stable, coordinate measurement of the designated point of tablet 17 starts. Other components of the liquid crystal tablet equipment are similar to those of the liquid crystal tablet equipment in accordance with the first embodiment. Therefore, description thereof is not repeated.

The tablet measuring circuit is not always active. Pressing of tablet 17 by a pen or the like is detected by sensing pressure, and from that timing, the tablet measuring circuit is rendered active. This approach reduces power consumption of the tablet measuring circuit. Therefore, immediately after activation of the tablet measuring circuit, the transistor is not stable. If coordinate measurement of the designated point is performed with the transistor in an unstable state, accuracy in coordinate measurement would be degraded. Therefore, coordinate measurement is performed after the lapse of a prescribed time period. If the start point of the timing for the prescribed wait time is the timing of activation of line pulse LP as described above, the following problem may arise. Namely, as the line pulse LP has short period, it is possible that the coordinate measurement of the designated point undesirably starts while the transistor in the tablet measuring circuit is still unstable. The liquid crystal tablet equipment in accordance with the second embodiment solves this problem.

Figure 4:
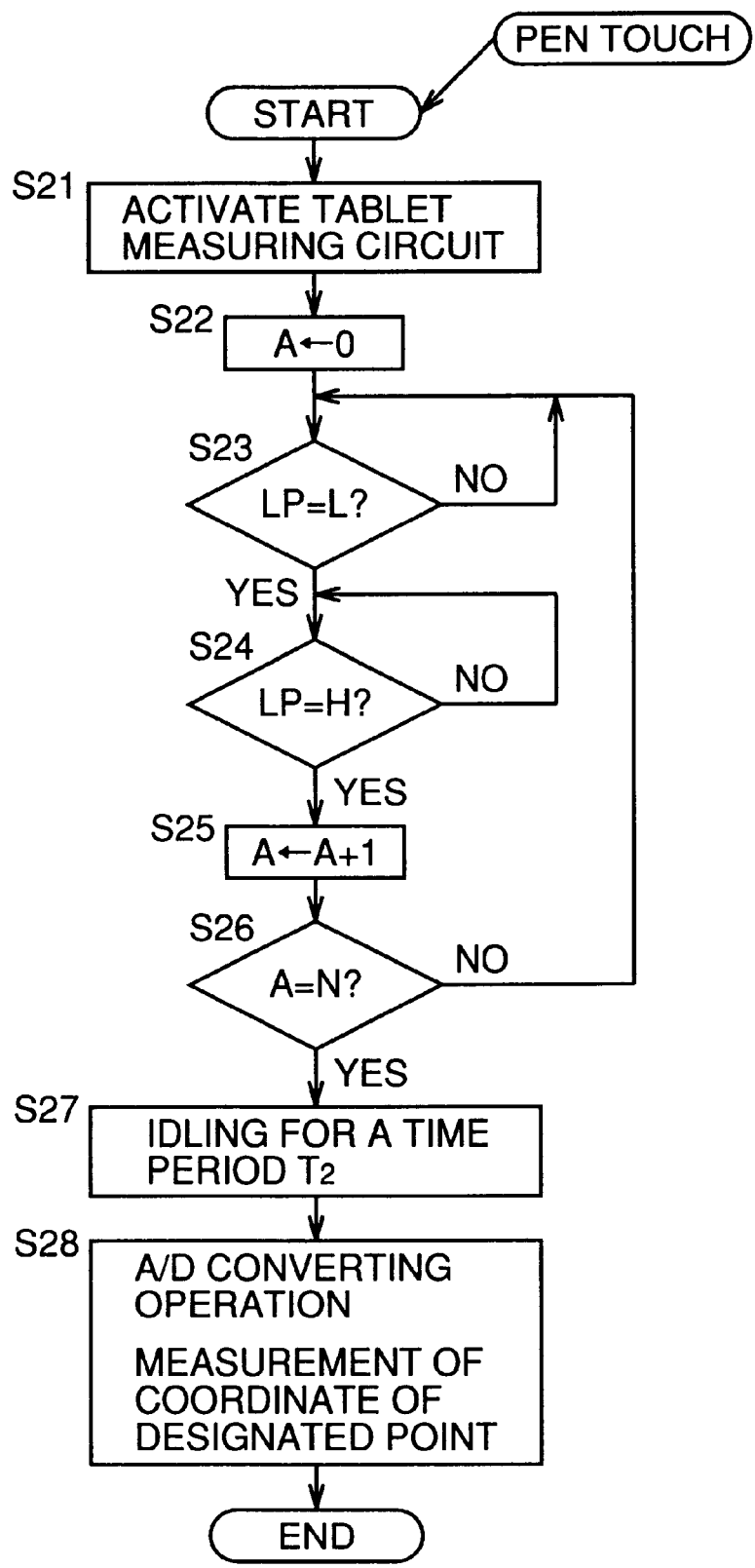
FIG. 4 is a flow chart related to the operation of the liquid crystal tablet equipment in accordance with a second embodiment.

Referring to FIG. 4, control operation of the liquid crystal tablet equipment will be described. In the flow chart of FIG. 4, it is assumed that pressing of a certain point of tablet 17 by a pen or the like has already been detected. The tablet measuring circuit provided in tablet control circuit 16 is rendered active (S21). A variable representing the number of times the line pulse LP attained from "L" to "H" level is represented by A. The variable A is cleared to 0 and initialized (S22). Control operation is temporarily stopped until line pulse LP attains to the "L" level (S23). When the line pulse LP attains to the "L" level (YES in S23), control operation is temporarily stopped until line pulse LP attains to "H" level (S24). When line pulse LP attains to the "H" level (YES in S24), variable A is incremented by 1 (S25). Namely, the variable A counts the number of transition of the line pulse LP from "L" to "H" level. Whether variable A has reached a prescribed value N or not is determined (S26). If the variable A does not yet reach the prescribed value N (NO in S26), the flow returns to step S23, and counting of times of line pulse LP attaining from "L" to "H" level is continued. The value N is determined in advance such that when the variable A reaches the prescribed value N, the transistor is already made stable. When the variable A reaches the prescribed value N (YES in S26), idling for a prescribed time period T2 is performed (S27). As in the first embodiment, the idling is to wait for attenuation of not only the noise caused by activation of the line pulse but also the noise caused by the edge of the ac converting signal M to the 0 level. Therefore, the idling is also included in the period of processing for coordinate measurement. In other words, coordinate measurement process starts after the transistor is made stable. Then A/D converting operation of A/D converter 18 starts. More specifically, A/D converter 18 converts analog X and Y coordinate signals output from tablet 17 to A/D converter 18 to digital data. CPU 11 receives the converted X and Y coordinate data, and measures the coordinate of the designated point pressed by the pen or the like.

One example of the value N will be described in the following. Assume that the line pulse LP has the period of 100 μsec, for example, and the time for the transistor to be stable is 50 μsec, for example. At this time, the value N should be set to 2. The reason is as follows. Assume that line pulse LP is activated immediately after turning ON of the transistor. At this time, the value of variable A is 1. Stabilization of the transistor is not ensured until after activation of line pulse LP after the lapse of the time period 50 μsec for stabilizing the transistor is detected. At this time, the value of variable A is 2. Assume that the period of the line pulse LP is 70 μsec and the time for stabilizing the transistor is 80 μsec, for example. At this time, the value N should be set to 3. The reason is as follows. Assume that the line pulse LP is activated immediately after turning ON of the transistor. At this time, the value A is 1. After the lapse of 70 μsec, the next line pulse LP attains active and the variable A attains to 2. At this time point, the transistor is not yet stabilized. After the lapse of 80 μsec which is the time necessary for stabilizing the transistor, activation of line pulse LP is detected and, for the first time, stabilization of the transistor is ensured. At this time, the value of variable A is 3.

In the liquid crystal tablet equipment in accordance with the second embodiment, after activation of the tablet measuring circuit and the transistor is surely stabilized, the process for coordinate measurement starts. Therefore, though the timing of activation of the line pulse LP having short period is used as a starting point of the wait time T2, high accuracy in coordinate measurement is ensured.

Third Embodiment

In the liquid crystal tablet equipment in accordance with the third embodiment, even if the line pulse LP is rendered active, the process for coordinate measurement is not started if it corresponds to the timing of inversion of the ac converting signal M. This is because the noise caused by inversion of the ac converting signal M is so large that the error in coordinate measurement would be significant. Further, the time period T2 necessary for the noise caused by the inversion of the ac converting signal M to be attenuated to the zero level is long, while the time (t6~t7) for the next line pulse LP to be activated is short, and therefore it is difficult to complete A/D conversion within the short period of time. Other components of the liquid crystal tablet equipment are the same as those of the liquid crystal tablet equipment in accordance with the first embodiment. Therefore, description thereof is not repeated.

Control operation of the liquid crystal tablet equipment will be described with reference to FIG. 5.

Figure 5:
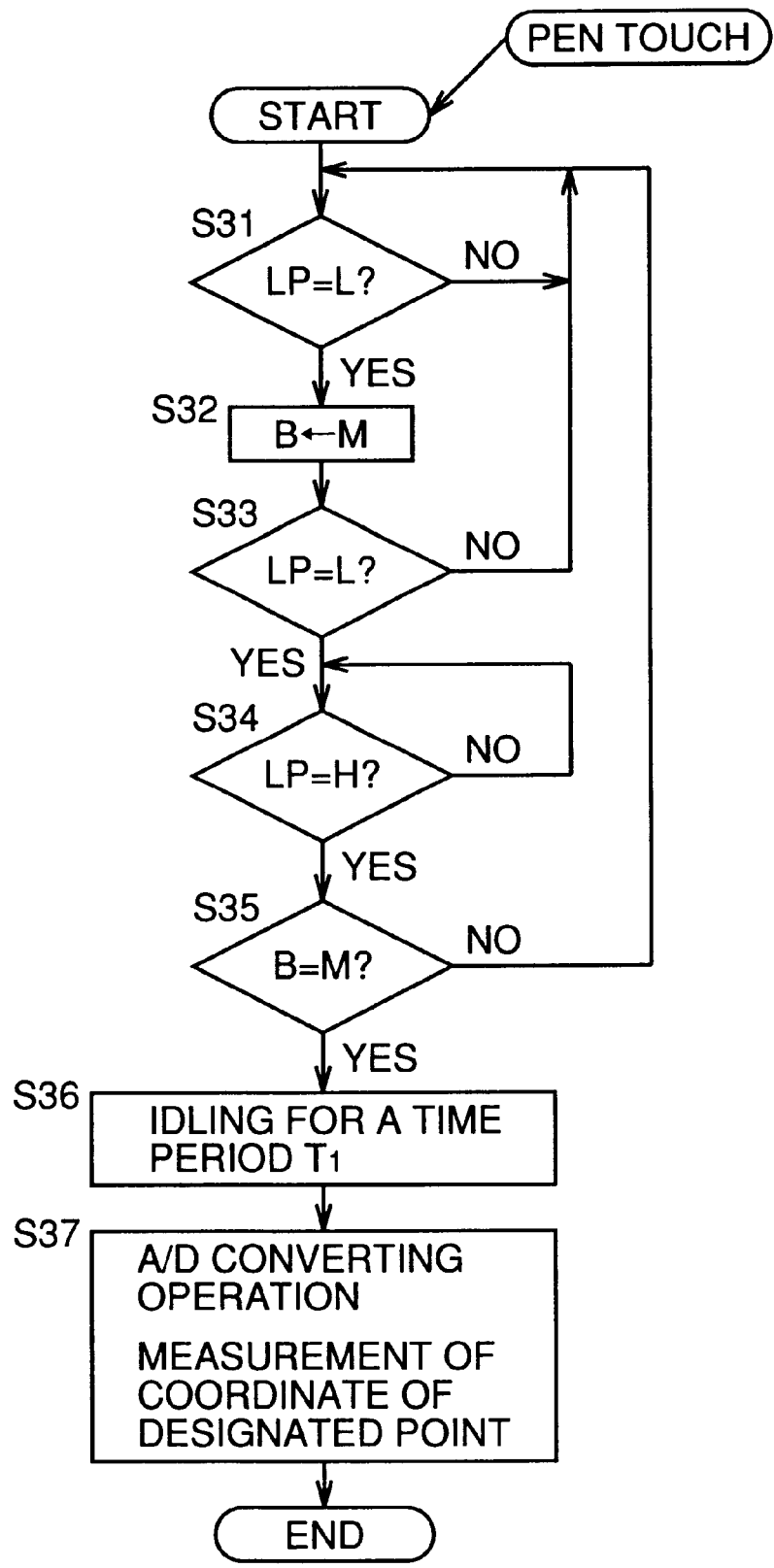
FIG. 5 is a flow chart related to the operation of the liquid crystal tablet equipment in accordance with a third embodiment.

In the flow chart of FIG. 5, it is assumed that pressing of a certain point on tablet 17 by a pen or the like has already been detected. Control operation is temporarily stopped until line pulse LP attains to "L" level (S31). The level (either "H" level or "L" level) of the ac converting signal M is set as a variable B (S32). Whether the line pulse LP is at the "L" level or not is checked (S33). If the line pulse LP has been activated and at the "H" level (NO in S33), the flow returns to step S31, and the level of the ac converting signal M is again set in the variable B. If the line pulse LP is still at the "L" level (YES in S33), the flow proceeds to the next step S34. This is to ensure that the level of the ac converting signal M set at variable B is the level while the line pulse LP is kept continuously at the "L" level.

As a pre-condition for starting the process for coordinate measurement, control operation is temporarily stopped until line pulse LP rises to active ("H") level (S34). Whether the level of the ac converting signal M and the level of the ac converting signal M set at variable B match each other or not is determined (S35). More specifically, whether these two are both at "H" level or both at the "L" level are determined. In other words, whether the ac converting signal M has been inverted or not is determined. When the ac converting signal M has been inverted (NO in S35), the flow does not proceed to the process of coordinate measurement starting from step S36, but the flow returns to step S31 and control operation is temporarily stopped until the ac converting signal M cease to be inverted. If the ac converting signal M is not inverted (YES in S35), idling for a prescribed time period T takes place in step S36. The time T1 of idling is shorter than the idling time T2 in steps S12 and S27 of the first and second embodiments. This is because the influence of noise caused by the inversion of the ac converting signal M has already been avoided.

Therefore, what is necessary for A/D converter 18 is simply to wait for attenuation of the relatively small noise caused by activation of the line pulse LP. Here, the time T1 is about 30 $\mu$sec, for example. Then A/D converter 18 starts A/D converting operation (S37). More specifically, A/D converter 18 converts analog X and Y coordinate signals output from tablet 17 to digital data. CPU 11 takes the converted X and Y coordinate data, and performs coordinate measurement of the designated point pressed by a pen or the like.

In the liquid crystal tablet equipment in accordance with the third embodiment, at the timing of inversion of the ac converting signal M, the process for coordinate measurement is avoided. Therefore, the liquid crystal tablet equipment is not influenced by the error of coordinate measurement caused by large noise derived from inversion of the ac converting signal M. Further, as the idling time T1 is short, it is possible for A/D converter 18 to finish A/D conversion at an early timing. Further, the time period for the next line pulse LP to be activated (t2~t3) is long. Therefore, A/D converter 18 can surely complete A/D conversion within this time period.

Fourth Embodiment

In the liquid crystal tablet equipment in accordance with the fourth embodiment, some functions are implemented in hardware. The same applies to the fifth embodiment which will be described later.

Figure 6:
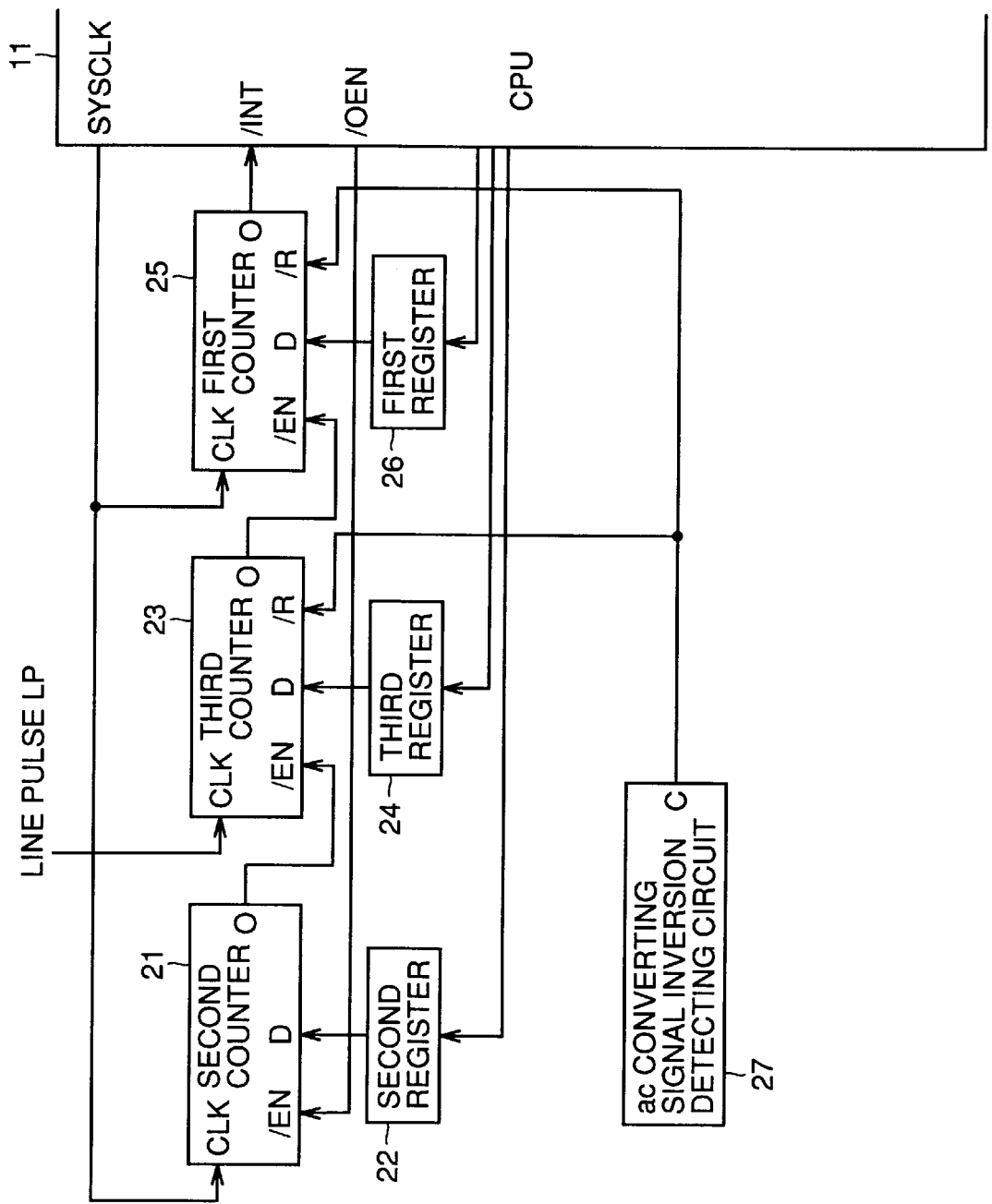
FIG. 6 is a block diagram showing a hardware configuration used for the liquid crystal tablet equipment in accordance with a fourth embodiment.

Referring to FIG. 6, the liquid crystal tablet equipment in accordance with the fourth embodiment includes, in addition to the components of the tablet equipment described with reference to FIG. 1, a second counter 21 for counting system clocks for measuring the time for stabilizing the transistor in the tablet measuring circuit (not shown), a second register 22 for setting a count up value of the second counter 21, a third counter 23 for counting line pulses LP output from liquid crystal display control circuit 14 (FIG. 1), a third register 24 for setting a count up value of the third counter 23, a first counter 25 for counting system clocks for measuring wait time from activation of line pulse LP until starting of A/D conversion, a first register 26 for setting count up value of the first counter 25, and an ac converting signal inversion detecting circuit 27 for detecting inversion of the ac converting signal M. Other components are the same as those of the liquid crystal tablet equipment in accordance with the first embodiment. Therefore, description thereof is not repeated.

Prescribed count up values are set in respective registers 22, 24 and 26 independent from each other, by CPU 11. Each of the counters 21,23 and 25 starts counting when an enable terminal /EN (in the specification, "/" represents negation) attains to "L". The count up value from each of the registers 22, 24 and 26 is input to data terminal D, and when the count value matches the count up value, the level of an output terminal O is switched from "H" to "L", and the level is output. The second counter 21 receives an enable signal OEN from CPU 11 at its enable terminal /EN. The third counter 23 has its enable terminal /EN connected to an output terminal O of the second counter 21. The first counter 25 has its enable terminal /EN connected to an output terminal O of the third counter 23. The ac converting signal inversion detecting circuit 27 receives the ac converting signal M from liquid crystal display control circuit 14, and switches the level of output terminal O from "H" to "L" level, when the ac converting signal M is inverted. The output terminal O is connected to reset terminals /R of the third counter 23 and the first counter 25. When the reset terminal /R attains to the "L" level, counters 23 and 25 are reset to "0" no matter what the count value is, and each counter start counting again.

The count up value set in each of the registers 22, 24 and 26 will be described. Assume that the system clock CLK is 13 MHz and the time for stabilizing the transistor of the tablet measuring circuit is 50 $\mu$sec, for example. At this time, the count up value set in the second register 22 would be $$50 \times 10^{-6} \div (1/13 \times 10^{6}) = 650.$$

Consider the count up value to be set in the third register 24. Generally, when the second counter 21 is counted up, the output terminal O thereof attains to "L" and the third counter 23 starts counting, the transistor of the tablet measuring circuit has already been stabilized. Therefore, the second counter 23 may be counted up at the time point of reception of the first line pulse LP. Therefore, the count up value to be set in the third register 24 may be "1". Assume that the time T1 from the timing of activation of the line pulse LP until the noise is attenuated to the zero level is 30 $\mu$sec. Here, the count up value to be set in the first register 26 would be $$30 \times 10^{-6} \div (1/13 \times 10^{6}) = 390.$$

The count up values described above are calculated in advance, and the calculated values are set when a program to be stored in the ROM 12 is prepared. By reading the program, CPU 11 sets respective count up values to registers 22, 24 and 26. The reason why the counters and registers are provided and setting of count up values of registers by CPU 11 are allowed will be described in the following. The reason is, in short, to enable general purpose use of the hardware configuration. Even when the type of the liquid crystal tablet equipment changes or specification changes, it is possible to cope with various types and specifications of the tablet equipments by calculating the count up values and incorporating the calculated values in the program, in accordance with the types and specifications.

Figure 7:
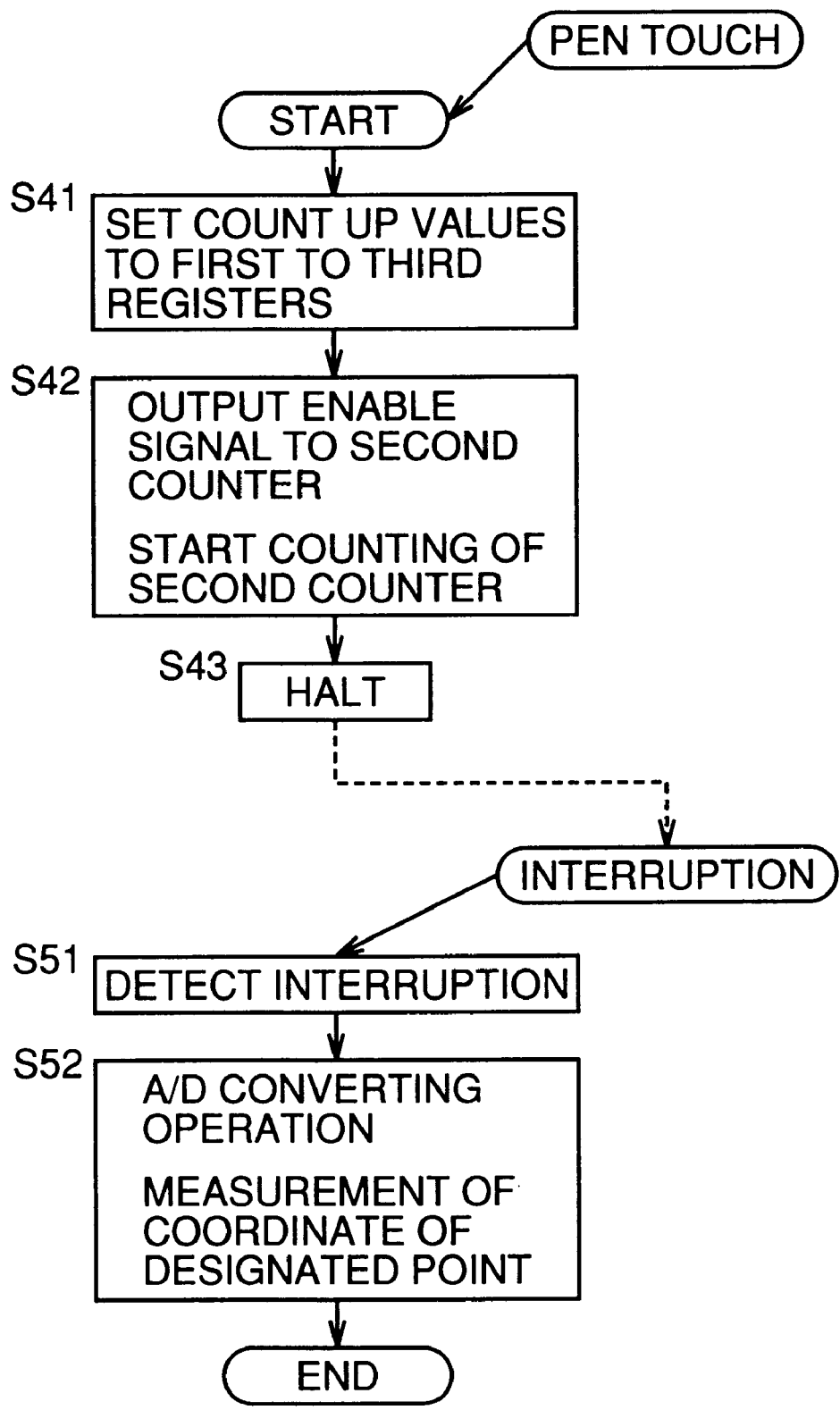
FIG. 7 is a flow chart related to the operation of the liquid crystal tablet equipment in accordance with the fourth embodiment.

The operation of the liquid crystal tablet equipment in accordance with the fourth embodiment will be described with reference to FIG. 7. In the flow chart of FIG. 7, it is assumed that pressing of a certain point of tablet 17 by a pen or the like has already been detected. In the present embodiment, it is assumed that the ac converting signal inversion detecting circuit 27 is not used. CPU 11 reads the program of ROM 12, and sets count up values (650, 1, 390) written therein at respective registers 22, 24 and 26 (S41). CPU 11 outputs the enable signal OEN to the second counter 21, so as to switch the enable terminal /EN to "L". Consequently, the second counter 21 starts an operation of counting the system clocks (S42). CPU 11 itself halts (S43). Thereafter, the hardware shown in FIG. 6 continues operation. For the CPU 11 to switch the enable terminal /EN of the second counter 21 to "L", a 1 bit flip-flop writable by the CPU 11 may be provided preceding the enable terminal /EN. Even when CPU 11 halts, the operation of the second counter 21 continues. CPU 11 may wait in the halt state, until there is an interruption.

The operation of the hardware shown in FIG. 6 will be described. The second counter 21 starts counting of the system clock from the moment when the enable terminal /EN attains to "L". The first counter 21 always compares the count value with the count up value (650) set in the second register 22. The first counter 21 has its output terminal O kept at the "H" level until it counts up. When the count value of the second counter 21 reaches the count up value, the output terminal O is switched to the "L" level. Accordingly, the enable terminal /EN of the third counter 23 attains to "L", and the third counter 23 starts counting of the line pulse LP. At the moment when the enable terminal /EN attains to "L", the line pulse LP is not input, and the line pulse LP is input after a while, and then the count value of the third counter 23 attains to "1". Thereafter, when the count value of the second counter 23 matches the count up value set in the third register 24 (that is, when one line pulse LP is input), the output terminal O is switched from "H" level to "L" level. The enable terminal /EN of the first counter 25 attains to the "L" level. Therefore, the first counter 25 starts counting of the system clock. The count value is always compared with the count up value (390) set in the first register 26, and the output terminal O is kept at the "H" level until the counter is counted up. When the count value of the first counter 25 reaches the count up value, the output terminal O is switched to the "L" level. The output terminal O of the first counter 25 is connected to an interrupt terminal /INT of CPU 11. As interrupt terminal /INT is inverted to the "L" level, CPU 11 is interrupted.

When interruption is detected (S51 of FIG. 7), CPU 11 resumes its operation from the halt state. CPU 11 has A/D converter 18 start A/D converting operation. More specifically, A/D converter 18 converts analog X and Y coordinate signals output from tablet 17 to digital data. CPU 11 takes the converted X and Y coordinate data, and measures coordinate of the designated point pressed by a pen or the like (S52).

In the liquid crystal tablet equipment in accordance with the present embodiment, the CPU 11 is in the halt state after activation of enable terminal /EN of the second counter 21 until the next interruption. Therefore, power consumption of the liquid crystal tablet equipment can be suppressed.

By the use of the hardware shown in FIG. 6, even when type or specification of the liquid crystal tablet equipment is changed, it is possible to generally cope with various types and specifications by calculating and incorporating in the program count up values in accordance with respective types and specifications.

When an inexpensive transistor having relatively long time for stabilization is used as the transistor of the tablet measuring circuit, the count up value to be set in the second register 22 should be made large. Conversely, when a transistor having short time for stabilization is used, a small count up value may be set, so as to reduce wait time. In an equipment of such type or specification in that time from the rise of the noise until attenuation of the noise to the zero level is long, the count up value to be set in the first register 26 should be made large. In an equipment of the type or specification of which attenuation time is short, the count up value may be set smaller. In this manner, even when time for stabilization of the transistor or noise duration varies dependent on the type or specification, optimal count up values may be set.

In a modification of the liquid crystal tablet equipment in accordance with the present invention, the first register 26 and the first counter 25 may be omitted. In that case, output terminal O of the third counter 23 is connected to the interrupt terminal /INT of CPU 11. In the control flow, the step of idling for the prescribed time period T1 similar to step S36 of FIG. 5 may be inserted between steps S51 and S52 of FIG. 7. The idling time T1 is to wait for attenuation of the relatively small noise caused by activation of the line pulse LP, which is 30 μsec, necessary for counting up of the first counter 25.

If it is not necessary to cope with variation of type and specification, the operation of setting count up values of respective registers by CPU 11 is not necessary. Further, it may be possible to omit respective registers and to use a dedicated counter having its own count up value set therein as each of the counters.

Fifth Embodiment

The liquid crystal tablet equipment in accordance with the fifth embodiment is adapted such that even when liquid crystal display control circuit 14 and liquid crystal display 15 are not driven and hence line pulse LP is not output, the process of coordinate measurement is possible when tablet 17 is designated by pen pressing, for example. More specifically, in the hardware configuration shown in FIG. 6, when the line pulse LP is not input to the third counter 23, the output terminal O of the third counter 23 is never switched to the "L" level no matter how long it is waited. Accordingly, no matter how long switching is waited, the output terminal O of the first counter 25 is never switched to "L" level, and therefore no interruption occurs for the CPU 11. The liquid crystal tablet equipment of the present embodiment solves this problem.

Figure 8:
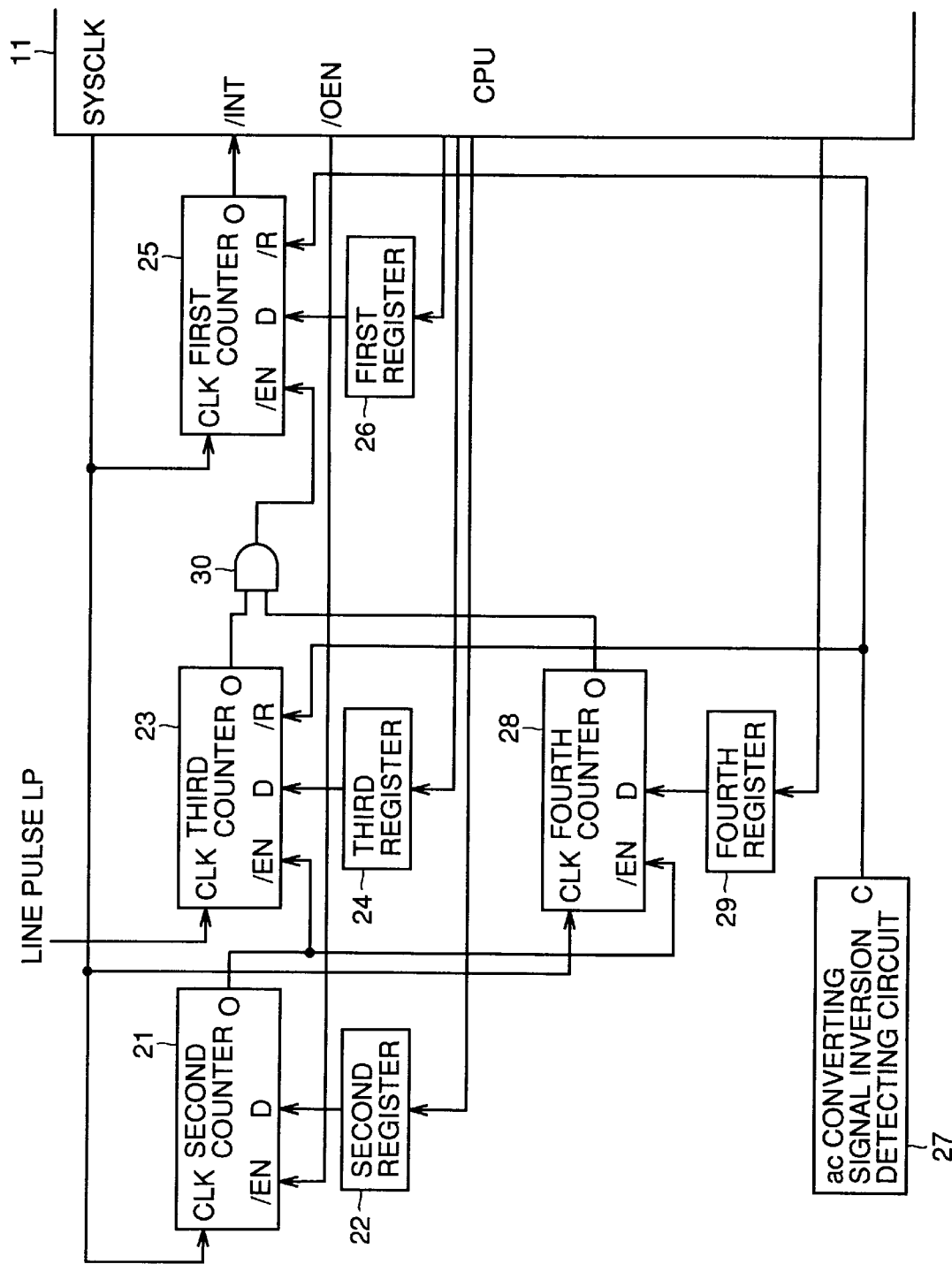
FIG. 8 is a block diagram showing electrical configuration of the liquid crystal tablet equipment in accordance with a fifth embodiment.

Referring to FIG. 8, the liquid crystal tablet equipment in accordance with the present embodiment includes a fourth counter 28 for counting system clocks, a fourth register 29 for setting a count up value of the fourth counter 28, and an AND gate 30 receiving outputs from output terminals O of the third counter 23 and a fourth counter 28 and outputting a result to an enable terminal /EN of the first counter 25 of the succeeding stage. The enable terminal /EN of the fourth counter 28 is connected, together with the enable terminal /EN of the third counter 23, to the output terminal O of the second counter 21 of the preceding stage. Other components are the same as those of the fourth embodiment (FIG. 6) and corresponding portions are denoted by the same reference characters. Therefore, description thereof is not repeated.

Assuming that the line pulse LP has the period of 100 μsec, for example, the number of system clocks generated in that period would be $$100 \times 10^{-6} \div (\frac{1}{13} \times 10^6) = 1300.$$

Therefore, with some margin, let us assume that "1400" is set in the fourth register 29.

The third counter 23 starts counting of the line pulses LP from the moment when the output terminal O of the second counter 21 is switched to the "L" level. The fourth counter 28 starts counting of the system clocks from the moment when the output terminal O of the second counter 21 is switched to the "L" level. When the third and fourth counters 23 and 28 are not counted up and respective output terminals O are at the "H" level, then the output of AND gate 30 is also at the "H" level and the enable terminal /EN of the first counter 25 is also at the "H" level, and therefore the first counter 25 is not activated. The third counter 23 counting the line pulse LP never counts up when liquid crystal display control circuit 14 and liquid crystal display 15 are not in operation and hence line pulse LP is not input. Therefore, the output terminal O of the third counter 23 is kept at the "H" level. However, the fourth counter 28 counts system clocks and the count value eventually reaches the count up value set in the fourth register 29. Consequently, the output terminal O of the fourth counter 28 is switched to the "L" level, and therefore the output of AND gate 30 attains to "L", activating the third counter 25. More specifically, even when liquid crystal display 15 is inoperative, when tablet 17 is pressed for designation by a pen or the like, the process for coordinate measurement of the designated point is executed. This function allows designation of a display of an electronic calculator, for example, on a personal digital assistant such as electronic organizer, and to have the display of the calculator only, with the liquid crystal display 15 as a whole kept OFF.

Sixth Embodiment

In the liquid crystal tablet equipment in accordance with the sixth embodiment, ac converting signal inversion detecting circuit 27 shown in FIG. 6 is utilized. This is to implement the process of the liquid crystal tablet equipment in accordance with the third embodiment (FIG. 5) (even when line pulse LP is active, the process for coordinate measurement is not started if it is the timing of inversion of the ac converting signal M) by a hardware.

Assume that the ac converting signal M is inverted when the third counter 23 is counting the line pulses LP or when the third counter 25 is counting the system clocks. Then, the ac converting signal inversion detecting circuit 27 detects the inversion, and switches an output terminal C thereof to "L" level. The third and first counters 23 and 25 receive at the reset terminals /R "L" level signals, respectively, and therefore counters 23 and 25 are reset, respectively. Thus both counters 23 and 25 restarts counting from "0". The first counter 25 counts up and the process of coordinate measurement starts only when the ac converting signal inversion detecting circuit 27 does not detect inversion of the ac converting signal M. Therefore, even when the line pulse LP is activated, the process for coordinate measurement is not started if the ac converting signal M is inverted. Therefore, the liquid crystal tablet equipment is not influenced by the error in coordinate measurement caused by the large noise derived from inversion of the ac converting signal M.

Seventh Embodiment

Figure 9:
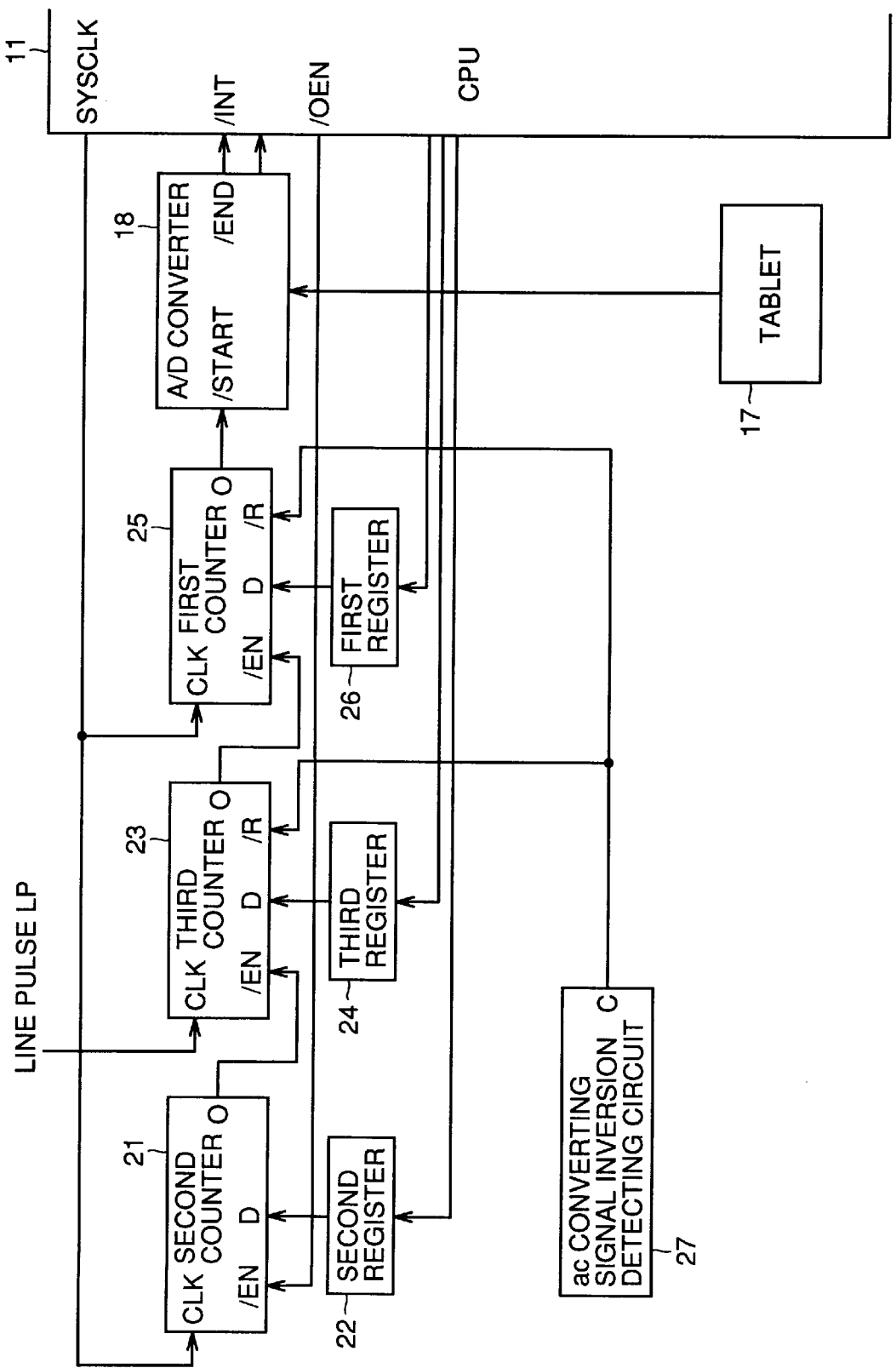
FIG. 9 is a block diagram showing electrical configuration of the liquid crystal tablet equipment in accordance with a seventh embodiment.

In the liquid crystal tablet equipment in accordance with the seventh embodiment, halt time of CPU 11 is made longer. Different from the example of FIG. 6 in which the output terminal O of the first counter 25 is connected to the interrupt terminal /INT of CPU 11, the output terminal O is connected to a start terminal /START of A/D converter 18 as shown in FIG. 9. Further, an end terminal /END of A/D converter 18 is connected to the interrupt terminal /INT of CPU 11. A/D converter 18 has its data input terminal connected to an output terminal of tablet 17, and its data output terminal connected to a data input port of CPU 11. Other components are the same as those of the fourth embodiment (FIG. 6) and corresponding portions are denoted by the same reference characters. Therefore, description thereof is not repeated.

After activation of the second counter 21, CPU 11 is in a halt state. When the first counter 25 is counted up and the output terminal O is switched to "L" level, the start terminal /START of A/D converter 18 attains to the "L" level. When the start terminal /START attains to the "L" level, A/D converter 18 is activated, and the operation of converting analog X and Y coordinate signals output from tablet 17 to digital X and Y coordinate data starts. The converted X and Y coordinate data are transmitted to CPU 11. After the end of A/D conversion, the end terminal /END is switched to the "L" level, and interruption occurs at the interrupt terminal /INT of CPU 11.

In the liquid crystal tablet equipment in accordance with the present embodiment, CPU 11 is kept at the halt state until the end of A/D converting operation by the A/D converter 18. Therefore, power consumption can further be reduced. Further, A/D conversion is performed with the CPU 11 being kept in the halt state. Therefore, A/D conversion with less noise is possible, and accuracy is improved.

Eighth Embodiment

The liquid crystal tablet equipment in accordance with the eighth embodiment corresponds to the configuration of FIG. 6 with the second counter 21 for counting the time for stabilization of the transistor in the tablet measuring circuit omitted, the function of the second counter 21 being performed additionally by the third counter 23.

Assuming that the system dock CLK is 13 MHz, for example, and the time for stabilization of the transistor in the tablet measuring circuit is 50 μsec, for example, the count up value to be set in the second register 22 is, from the foregoing, $$50 \times 10^{-6} \div (\frac{1}{13} \times 10^6) = 650.$$

There is the following relation:

$$2^9 = 512 < 650 < 2^{10} = 1024.$$

Accordingly, the number of flip-flops constituting the second counter 21 is 10. Therefore, the second counter 21 has relatively complicated structure. Further, the second register 22 is also necessary.

The time period 50 μsec for stabilizing the transistor is smaller than the period of 100 μsec of the line pulse LP. Therefore, measurement of 50 μsec by counting 650 clocks of 13 MHz may be replaced by one more count of line pulse LP. Therefore, as count up value, "2" is set in the third register 24. Therefore, only two flip-flops is necessary for constituting the third counter 23.

The liquid crystal tablet equipment of the present embodiment may be implemented by omitting the second counter 21 and the second register 22 from the configuration of FIG. 6, and by connecting the enable signal OEN from CPU 11 to the enable terminal /EN of the third counter 23.

Ninth Embodiment

The liquid crystal tablet equipment in accordance with the ninth embodiment is to avoid coordinate measurement when pressing for designation of a desired point on tablet 17 by a pen or the like is not sufficient, so as to improve accuracy in coordinate measurement. The liquid crystal tablet equipment in accordance with the present invention is similar to the liquid crystal tablet equipment in accordance with the first embodiment. Therefore, description thereof is not repeated.

Figure 10:
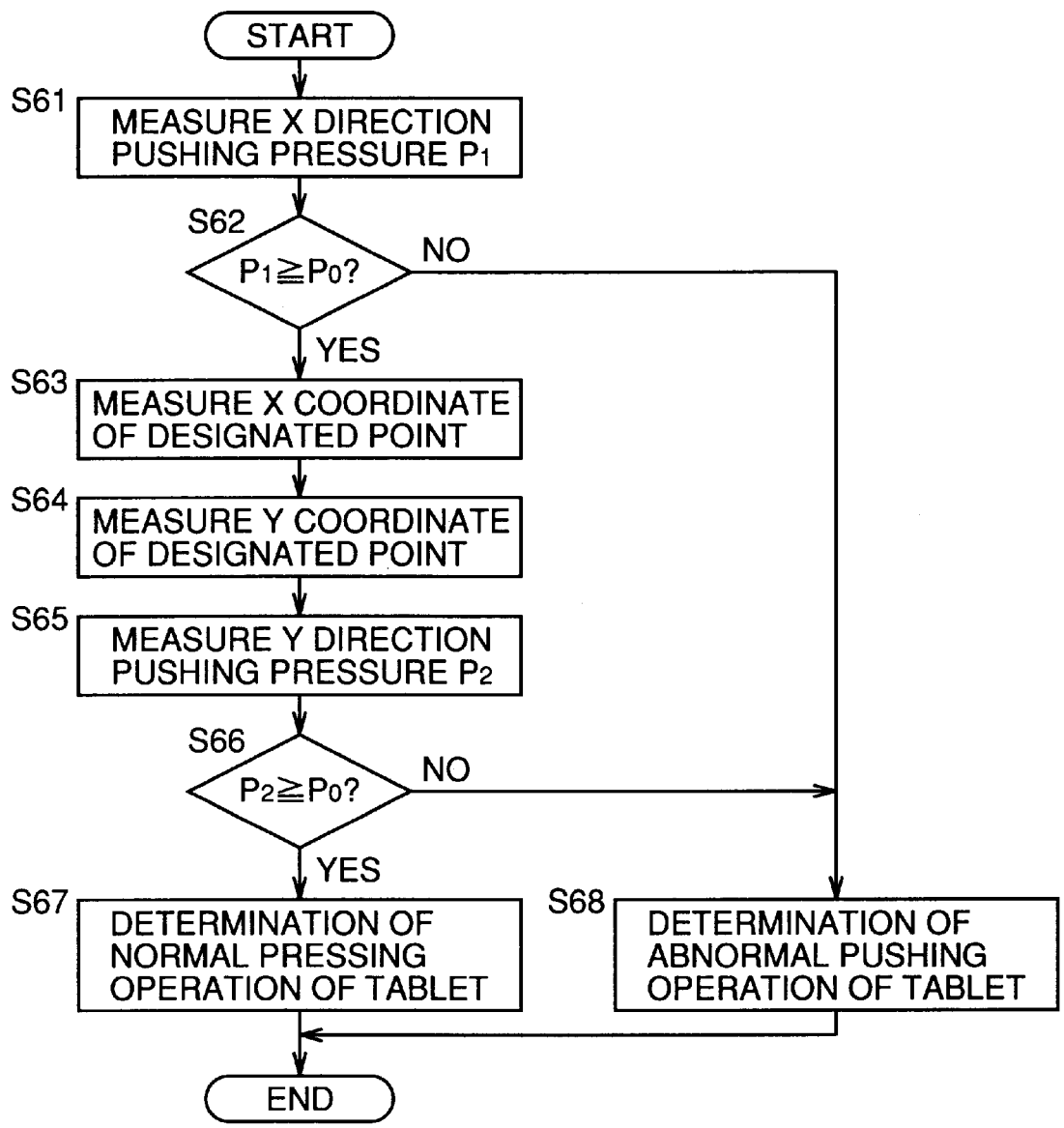
FIG. 10 is a flow chart related to the operation of the liquid crystal tablet equipment in accordance with a ninth embodiment.

Referring to FIG. 10, the control operation of the liquid crystal tablet equipment will be described. A user designates a point by pressing a desired point on tablet 17 by a pen or the like. By the pressing, two conductive films constituting tablet 17 are brought into contact at the designated point. The contact resistance is compared with a prescribed value, and pushing pressure of tablet 17 is measured. A conductive film providing voltage gradient in X direction is different from a conductive film providing voltage gradient in Y direction. Pushing pressure is measured for each of the conductive films. Here, measurement of the pushing pressure of the conductive film providing voltage gradient in the X direction will be referred to as "X direction pushing pressure" and measurement of pushing pressure of the conductive film providing voltage gradient in the Y direction will be referred to as "Y direction pushing pressure."

Measurement of pushing pressure $P_1$ in the X direction for tablet 17 is performed (S61). Whether pushing pressure $P_1$ is not smaller than a prescribed value $P_0$ meaning that the pressing of tablet 17 is normal, is determined. If pushing pressure $P_1$ is smaller than the prescribed value $P_0$ (NO in S62), it is determined that normal pressing operation on tablet 17 is not performed, and therefore operation is completed (S68). When the pushing pressure $P_1$ in the X direction is not smaller than the prescribed value $P_0$ (YES in S62), the X coordinate of the designated point on tablet 17 is measured. The Y coordinate of the designated point on tablet 17 is measured (S64). The Y direction pushing pressure $P_2$ of tablet 17 is measured (S65). Whether the pushing pressure $P_2$ is not smaller than the prescribed value $P_0$ is determined (S66). If the pushing pressure $P_2$ is smaller than the prescribed value $P_0$ (NO in S66), it is determined that normal pressing operation of tablet 17 is not performed, and operation is terminated (S68). If Y direction pushing pressure $P_2$ is not smaller than the prescribed value $P_0$ (YES in S66), it is determined that X and Y coordinates of the designated point are measured correctly with the tablet 17 pressed normally (S67).

Conventional general procedure has been in the order of (1) measurement of X direction pushing pressure→(2) measurement of X coordinate→(3) measurement of Y direction pushing pressure→(4) measurement of Y coordinate. In this case, however, it is possible that the Y direction pushing pressure is not sufficient at the time point of measurement of Y coordinate, which may possibly degrade reliability in the accuracy of Y coordinate measurement.

By contrast, in the present embodiment, Y direction pushing pressure $P_2$ is measured after Y coordinate measurement. If the pushing pressure is normal, it is determined that the overall measurement has been successful, and if the pushing pressure is insufficient, it is determined that the measurement is not successful. Therefore, reliability of measurement of both X and Y coordinates can be kept high.

Here, measurement may be repeated by returning from step S68 to step S61.

Tenth Embodiment

In the liquid crystal tablet equipment in accordance with the tenth embodiment, coordinate measurement when pressure for designation of a desired point on tablet 17 by a pen or the like is insufficient is avoided, to improve accuracy in coordinate measurement. The liquid crystal tablet equipment of the present invention is the same in structure as the liquid crystal tablet equipment in accordance with the first embodiment. Therefore, description thereof is not repeated.

Figure 11:
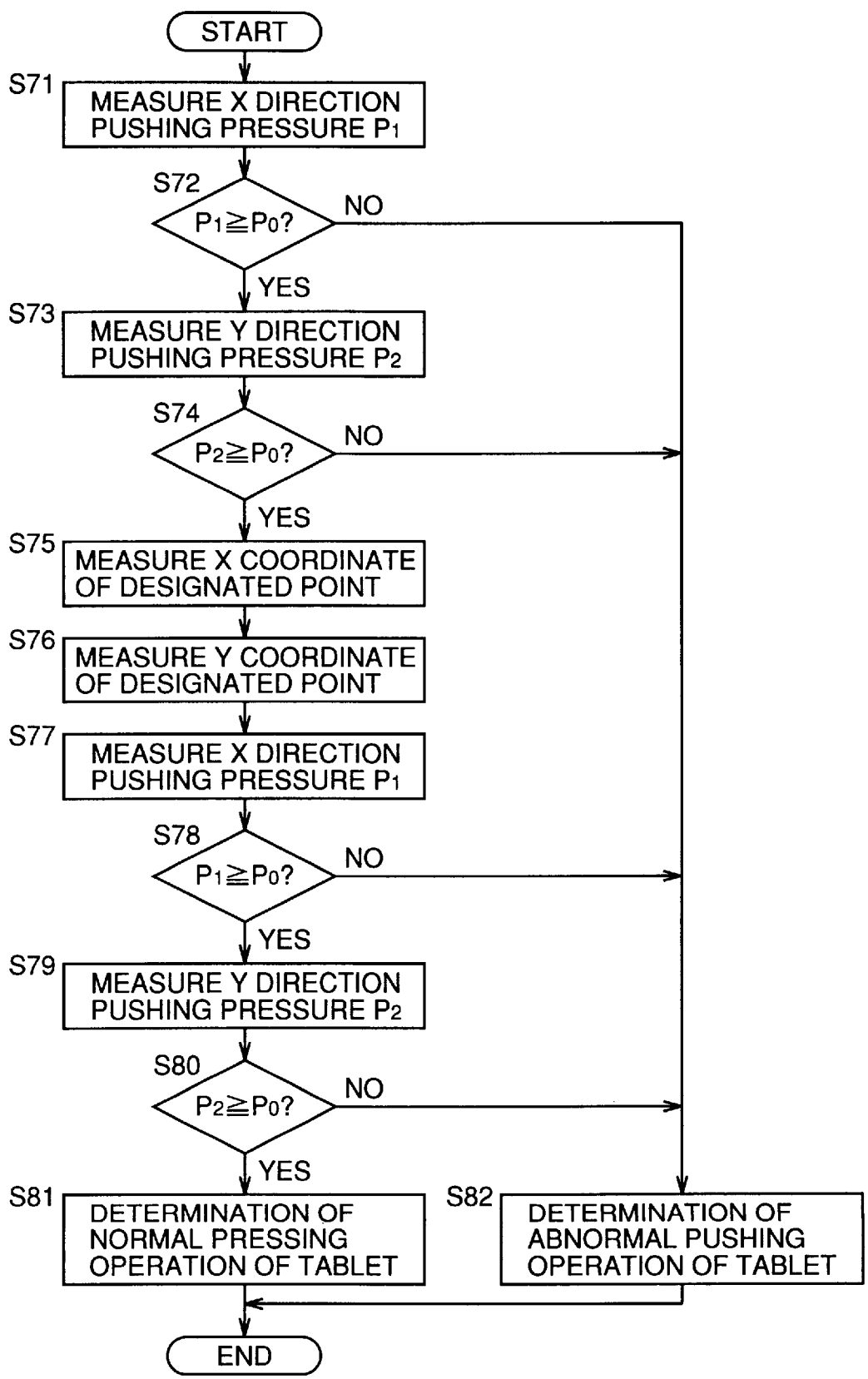
FIG. 11 is a flow chart related to the operation of the liquid crystal tablet equipment in accordance with a tenth embodiment.

Referring to FIG. 11, control operation of the liquid crystal tablet equipment will be described. X direction pushing pressure $P_1$ of tablet 17 is measured (S71). Whether pushing pressure $P_1$ is not smaller than the prescribed value $P_0$ or not, that is, whether pressing of tablet 17 is normal, is determined. If pushing pressure $P_1$ is smaller than the prescribed value $P_1$ (NO in S71), it is determined that normal pushing operation of tablet 17 is not performed, and the operation is terminated (S82). When the X direction pushing pressure $P_1$ is not smaller than the prescribed value $P_0$ (YES in S72), then Y direction pushing pressure $P_2$ is measured (S73). Whether pushing pressure $P_2$ is not smaller than the prescribed value $P_0$ or not is determined (S74). If pushing pressure $P_2$ is smaller than the prescribed value $P_0$ (NO in S74), it is determined that normal pressing operation of tablet 17 is not performed, and the operation is terminated (S82). When Y direction pushing pressure $P_2$ is not smaller than the prescribed value $P_0$ (YES in S74), X coordinate of the designated point on tablet 17 is measured (S75). Thereafter, Y coordinate of the designated point on tablet 17 is measured (S76). Then X direction pushing pressure $P_1$ is again measured (S77). Whether pushing pressure $P_1$ is not smaller than the prescribed value $P_0$ or not is determined (S78). If the pushing pressure $P_1$ is smaller than the prescribed value $P_0$ (NO in S78), it is determined that tablet 17 is not normally pressed, and the operation is terminated (S82). If the pushing pressure $P_1$ is not smaller than the prescribed value $P_0$ (YES in S78), Y direction pushing pressure $P_2$ is measured (S79). Whether pushing pressure $P_2$ is not smaller than the prescribed value $P_0$ or not is determined (S80). If the pushing pressure $P_2$ is smaller than the prescribed value $P_0$ (NO in S80), it is determined that the tablet 17 is not normally pressed, and the operation is terminated (S82). If the pushing pressure $P_2$ is not smaller than the prescribed value $P_0$ (YES in S80), it is determined that X and Y coordinates of the designated point are measured correctly with the tablet 17 pressed normally.

More specifically, measurement of X direction pushing pressure $P_1$ and measurement of Y direction pushing pressure $P_2$ are executed continuously as a pair. Thereafter, measurement of X coordinate and measurement of Y coordinate of the designated point are executed continuously as a pair. Thereafter, for confirmation, measurement of X direction pushing pressure $P_1$ and measurement of Y direction pushing pressure $P_2$ are continuously executed as a pair in the final stage.

In the liquid crystal tablet equipment of the present embodiment, measurement of X direction pushing pressure $P_1$ and measurement of Y direction pushing pressure $P_2$ are each carried out twice. In other words, measurements of X and Y pushing pressures $P_1$ and $P_2$ are executed before and after the measurement of X and Y coordinates of the designated point. Though it takes time for measurement, the X and Y coordinates are measured under the condition where the pressing operation of the tablet 17 is highly reliable. Therefore, measurement of X and Y coordinates is highly reliable.

Measurement may be repeated by returning from step S82 to step S71.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A coordinate data output equipment, comprising:

display means for displaying an image data on a screen;

line pulse generating means for applying line pulse signals with a prescribed interval to each of an array of pixels constituting said display means;

coordinate signal output means stacked on said display means for outputting a coordinate signal of a designated point;

digital signal converting means for converting said coordinate signal to a digital signal;

coordinate data calculating means for calculating a coordinate data from said digital signal;

control means for letting said digital signal converting means convert said coordinate signal to said digital signal after a prescribed time period from a timing of activation of one said line pulse signal;

wherein said control means counts a number of said line pulse signals from the timing of activation of one said time line pulse signal, and letting said digital signal converting means convert said coordinate signal to said digital signal after said prescribed time period from a time point when a count value of said line pulse signals attains a prescribed value;

said prescribed value being determined dependent on a relation with a time necessary for a switching element constituting said coordinate data calculating means to be electrically stabilized;

wherein said line pulse generating means further applies an ac converting signal having its polarity inverted at every prescribed interval to said display means;

said coordinate data output equipment further comprising ac converting signal inversion detecting means for detecting inversion of the polarity of said ac converting signal; and wherein said control means has said digital signal converting means convert said coordinate signal to said digital signal if the count value of said line pulse signals attains said prescribed value and said prescribed time period has past from a time point when the polarity of said ac converting signal is not inverted.

2. The coordinate data output equipment according to claim 1, wherein said line pulse generating means further applies an ac converting signal having its polarity inverted at every prescribed interval to said display means;

said coordinate data output equipment further includes an ac converting signal inversion detecting circuit for detecting inversion of the polarity of said ac converting signal; and wherein said control signal has said digital signal converting means convert said coordinate signal to said digital signal at a timing when the polarity of said ac converting signal is not inverted and said prescribed time period has passed from activation of one said line pulse signal.

3. The coordinate data output equipment according to claim 1, wherein said control means measures pushing pressure of one of X and Y directions of said coordinate signal output means after a prescribed time period from the timing of activation of said line pulse signal, has said digital signal converting means convert said coordinate signal in X and Y directions output from said coordinate signal output means to said digital signal when the pushing pressure of said one direction is not smaller than a first pressure, has said coordinate data calculating means convert said digital signal to said coordinate data, measures pushing pressure of the other one of the X and Y directions of said coordinate signal output means after conversion to said coordinate data, and determines that said coordinate data is accurate if pushing pressure of said the other direction is not smaller than a second pressure.

4. The coordinate data output equipment according to claim 1, wherein said control means measures pushing pressure in X and Y directions of said coordinate signal output means after said prescribed time period from the timing of activation of said line pulse signal, has said digital signal converting means convert said coordinate signal in X and Y directions output from said coordinate signal output means to said digital signal if measured said pushing pressures are not smaller than first and second pressures, respectively, has said coordinate data calculating means convert said digital signal to said coordinate data, measures pushing pressures in X and Y directions of said coordinate signal output means after conversion to said coordinate data, and determines that said coordinate data is accurate if the second measured said pushing pressures are not smaller than said first and second pressures, respectively.

5. A coordinate data output equipment, comprising:

display means for displaying an image data on a screen;

line pulse generating means for outputting line pulse signals at a prescribed interval to each of an array of pixels constituting said display means;

coordinate signal output means stacked on said display means for outputting a coordinate signal of a designated point;

digital signal converting means for converting said coordinate signal to a digital signal;

coordinate data calculating means for calculating coordinate data from said digital signal;

a first counter for counting number of system clocks from a timing of activation of one said line pulse signal until the number reaches a first count number;

control means for letting said digital signal converting means convert said coordinate signal to said digital signal after counting up of said first counter; wherein said first count number is determined dependent on a relation with a time period necessary for noise of said coordinate signal generated by activation of said line pulse signal to attenuate;

a second counter for counting the number of said system clocks up to a second count number;

a third counter for counting the number of said line pulses up to a third count number, from a time point when said second counter is counted up;

wherein said second count number is determined dependent on a relation with a time period for a switching element constituting said coordinate data calculating means to be electrically stabilized, and said first counter starts counting from a time point when said third counter is counted up.

6. The coordinate data output equipment according to claim 5, further comprising:

first, second and third registers for setting said first, second and third count numbers in said first, second and third counters, respectively.

7. The coordinate data output equipment according to claim 6, further comprising:

a fourth counter for counting the number of the system clocks up to a fourth count number when said line pulse generating means is not in operation; and a fourth register for setting said fourth count number in said fourth counter; wherein said fourth count number is determined dependent on a relation with a time period for said switching element constituting said coordinate data calculating means to be electrically stabilized, and said first counter starts counting from a time point when said third counter or said fourth counter is counted up.

8. The coordinate data output equipment according to claim 5, further comprising:

a fourth counter for counting the number of the system clocks up to a fourth count number when said line pulse generating means is not in operation; wherein said fourth count number is determined dependent on a relation with a time period for said switching element constituting said coordinate data calculating means to be electrically stabilized, and said first counter starts counting from a time point when said third counter or said fourth counter is counted up.

9. The coordinate data output equipment according to claim 5, further comprising:

a first register for setting said first count number in said first counter.

10. A liquid crystal tablet equipment, comprising:

a liquid crystal display;

a display control circuit for applying line pulse signals at a prescribed interval to each of an array of pixels constituting said liquid crystal display;

a tablet stacked on said liquid crystal display;

a A/D converter receiving a coordinate signal output from said tablet;

a tablet control circuit for calculating coordinate data from a digital signal output from said A/D converter;

a CPU for letting said A/D converter output said digital signal, after a prescribed time period from a timing of activation of one said line pulse signal;

wherein said CPU counts the number of said line pulse signals from a timing of activation of one said line pulse signal, and has said A/D converter output said digital signal after said prescribed time period from a time point when count value of said line pulse signals attains a prescribed value, and wherein said prescribed value is determined dependent on a relation with a time period for a switching element constituting said tablet control circuit to be electrically stabilized;

wherein said liquid crystal display control circuit further applies an ac converting signal having its polarity inverted at a prescribed interval to said liquid crystal display;

said liquid crystal tablet equipment further comprising an ac converting signal inversion detecting circuit for detecting inversion of the polarity of said ac converting signal; and wherein said CPU has said A/D converter output said digital signal if the count value of said line pulse signals attains said prescribed value and said prescribed time period has past from a time point when the polarity of said ac converting signal is not inverted.

11. The liquid crystal tablet equipment according to claim 10, wherein said liquid crystal display control circuit further applies an ac converting signal having its polarity inverted at a prescribed interval to said liquid crystal display;

said liquid crystal tablet equipment further comprising an ac converting signal inversion detecting circuit for detecting inversion of the polarity of said ac converting signal; wherein said CPU has said A/D converter output said digital signal at a timing when the polarity of said ac converting signal is not inverted and said prescribed time period has passed from activation of one said line pulse signal.

12. The liquid crystal tablet equipment according to claim 10, wherein said CPU measures pushing pressure of one of X and Y directions of said tablet after said prescribed time period from the timing of activation of said line pulse signal, if the pushing pressure of said one direction is not smaller than a first pressure, has said A/D converter convert said coordinate signal in X and Y directions output from said tablet to said digital signal, has said tablet control circuit convert said digital signal to said coordinate data, measures pushing pressure in the other of X and Y directions of said tablet after conversion to said coordinate data, and if said the other pushing pressure is not smaller than a second pressure, determines that said coordinate data is accurate.

13. The liquid crystal tablet equipment according to claim 10, wherein said CPU measures pushing pressures of X and Y directions of said tablet after said prescribed time period from the timing of activation of said line pulse signal, if said measured pushing pressures are not smaller than first and second pressures, respectively, has said A/D converter convert said coordinate signal in X and Y directions output from said tablet to said digital signal, has said tablet control circuit convert said digital signal to said coordinate data, measures pushing pressures in X and Y directions of said tablet after conversion to said coordinate data and if the second measured said pushing pressures are not smaller than said first and second pressures, determines that said coordinate data is accurate.

14. A liquid crystal tablet equipment, comprising:

a liquid crystal display;

a liquid crystal display control circuit for outputting line pulse signals at a prescribed interval to each of an array of pixels constituting said liquid crystal display;

a tablet stacked on said liquid crystal display;

an A/D converter receiving a coordinate signal output from said tablet;

a tablet control circuit for calculating coordinate data from a digital signal output from said A/D converter;

a first counter for counting system clocks up to a first count number from a timing of activation of said line pulse signal;

a CPU for letting said A/D converter output said digital signal after said first counter is counted up; wherein said first count number is determined dependent on a relation with a time period necessary for noise of said coordinate signal generated by activation of one said line pulse signal to attenuate;

a second counter for counting the number of said system clocks up to a second count number;

a third counter for counting the number of said line pulse signals up to a third count number from a time point when said second counter is counted up;

wherein said second count number is determined dependent on a relation with a time period for a switching element constituting said tablet control circuit to be electrically stabilized, and wherein said first counter starts counting from a time point when said third counter is counted up.

15. The liquid crystal tablet equipment according to claim 14, further comprising:

first, second and third registers for setting said first, second and third count numbers in said first, second and third counters.

16. The liquid crystal tablet equipment according to claim 15, further comprising a fourth counter for counting the number of system clocks up to a fourth count number when said liquid crystal display control circuit is not in operation; and a fourth register for setting said fourth count number in said fourth counter; wherein said fourth count number is determined dependent on a relation with time for said switching element constituting said tablet control circuit to be electrically stabilized, and said first counter starts counting from a time point when said third counter or said fourth counter is counted up.

17. The liquid crystal tablet equipment according to claim 14, further comprising a fourth counter for counting the number of system clocks up to a fourth count number when said liquid crystal display control circuit is not in operation; wherein said fourth count number is determined dependent on a relation with time for said switching element constituting said tablet control circuit to be electrically stabilized, and said first counter starts counting from a time point when said third counter or said fourth counter is counted up.

18. The liquid crystal tablet equipment according to claim 14, further comprising a first register for setting said first count number in said first counter.

* * * * *